No. 776,999. PATENTED DEC. 6, 1904.
C. H. CASPAR.
MASHING AND CONVERTING PROCESS.
APPLICATION FILED SEPT. 23, 1902.
NO MODEL.
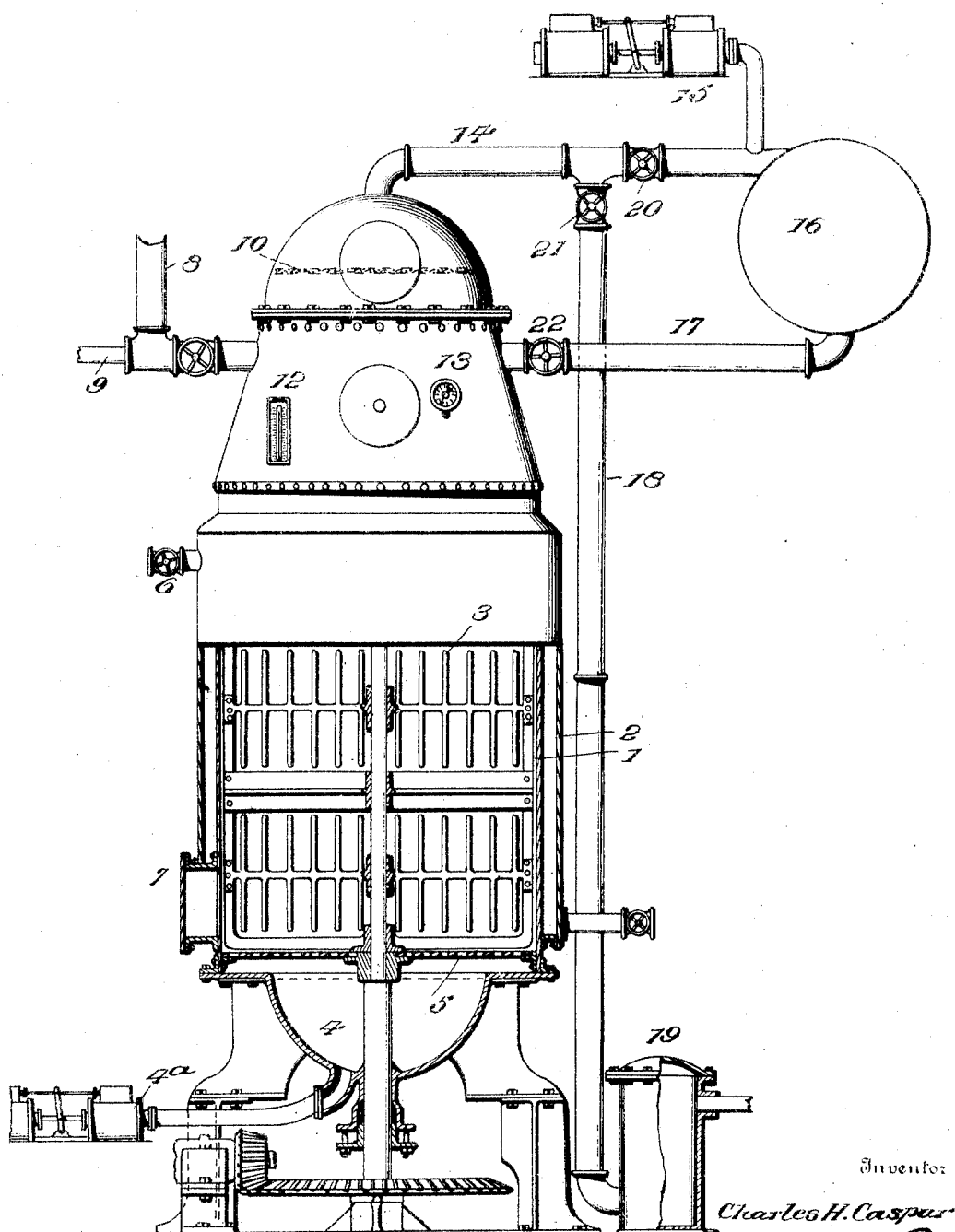

No. 776,999.　　　　　　　　　　　　　　　Patented December 6, 1904.

UNITED STATES PATENT OFFICE.

CHARLES HAYES CASPAR, OF NEWARK, NEW JERSEY, ASSIGNOR OF ONE-HALF TO JOHN P. FITZGERALD, OF SCRANTON, PENNSYLVANIA.

MASHING AND CONVERTING PROCESS.

SPECIFICATION forming part of Letters Patent No. 776,999, dated December 6, 1904.

Application filed September 23, 1902. Serial No. 124,568. (No model.)

*To all whom it may concern:*

Be it known that I, CHARLES HAYES CASPAR, a citizen of the United States, residing at Newark, in the county of Essex and State of New Jersey, have invented certain new and useful Improvements in Mashing and Converting Processes; and I do hereby declare the following to be a full, clear, and exact description of the invention, such as will enable others skilled in the art to which it appertains to make and use the same.

This invention relates to mashing and converting processes, and contemplates as its primary object effecting the complete conversion (embracing the mashing, boiling, and filtering) in one operation; and a further object is to obtain a maximum amount of wort by the action of a relative amount of malt; and a further object is to condense the vapors arising from the boiling mash and return them to the tun.

The invention will be hereinafter fully set forth, and particularly pointed out in the claims.

In the accompanying drawing I have illustrated mechanism by which my invention as applied to brewing may be carried out, the figure being a view in vertical section and side elevation.

1 designates the mash-tun, having a steam-jacket 2 and agitator 3, which may be constructed and operated in any preferred manner. The tun-casing is made of metal and so constructed as to render it air-tight. At its lower end is an inlet 4, through which water or other liquid is forced by a pump $4^a$. Above this inlet is a perforated bottom 5.

6 is the steam-inlet, and 7 the outlet for the mash—that is, the grain remaining after the extraction and conversion are completed.

At the top of the casing is the inlet 8 for the malt and raw material and pipe 9, through which mixing-water may be admitted. A filter 10 extends across the interior of the casing and is supported in the wall thereof. 12 and 13 are a thermometer and vacuum-gage, respectively. From the top of the casing an outlet-pipe 14 leads to a condenser 16, and a pump 15 is connected to the pipe 14 near the condenser, a return-pipe 17 completing the circulation between the condenser and the tun.

18 is the wort-pipe, leading from the outlet-pipe 14 to a secondary filter 19, if the use of the latter be desired, through which the wort is transmitted to the brewing-kettle. (Not shown.)

20, 21, and 22 are valves controlling the passage through pipes 14, 18, and 17, respectively. While the converting process is in progress valves 20 and 22 are open to admit gases to the condenser and return them to the tun, valve 21 being in the meantime closed. After the conversion has been completed valves 20 and 22 are closed and valve 21 opened to allow the wort to pass down through pipe 18.

In practicing my invention in connection with brewing I employ the well-known ingredient malt, with rice, corn, grits, or other raw grain in the proportions best adapted to produce the desired end. These are pulverized or ground together and introduced through inlet 8 and the desired amount of mixing-water introduced through pipe 9. When a sufficient amount of ingredients has been introduced, steam is admitted to the steam-jacket through inlet 6 and the agitator set in motion. All openings to the atmosphere are then closed and pump 15 set in operation to exhaust the air from the tun and create a suitable degree of vacuum. While I am aware that a complete vacuum is practically not obtainable, yet it is essential that the air be exhausted until the desired vacuum is had. It is well known to those skilled in the art that the diastase of the malt will convert the starch of the grain only between certain temperatures, and while various temperatures have been assigned as that at which the best effect is produced yet the same is universally acknowledged to be much less than 212° Fahrenheit—the boiling-point of water. I have found the best action occurs between 148° and 152° Fahrenheit. As it is essential to the successful carrying out of my process that the mash be boiled and yet the temperature found conducive to the best results not exceeded, I employ the vacuum, and am thereby enabled to obtain the effect of boiling at a temperature below the boiling-point—212° Fahrenheit. The temperature at which this action occurs may be varied according to the degree of vacuum maintained in the tun. In the boiling process vapors of steam and gases from the alcohol or other spirits in the mash are emitted, which if allowed to remain in the tun would destroy the vacuum and affect the wort, while their creation consumes a certain amount of the moisture necessary to the conversion, as there should be for this purpose approximately five parts of water to one part of material. To obviate this, valves 20 and 22 are opened and valve 21 closed. The vapors rise from the mash and pass through pipes 17 and 14 to the condenser 16, where they are converted into liquid and returned to the tun through pipe 17. The steam condenses readily, but the gases may not, and if it is desired to draw them from the condenser the pump 15 may be operated for this purpose. Thus the condensation enables the vacuum to be maintained, and the return of liquid keeps the mash supplied with the necessary amount of water. The condenser operates on the surface principle, and its office may be performed by cold water sprayed on the outside thereof. When a sufficient action of the diastase upon the starch of the raw grain has been effected through the saturation and boiling in the presence of a vacuum, the pump 4ª is operated to inject more water into the tun, filling the latter and forcing the fluid or wort upward through filter 10. The wort passes through pipe 14 into pipe 18, by which latter it is conducted to the brewing apparatus. For this purpose valve 20 is closed. In this way the removal of the wort-water, its necessary dilution, and filtration are effected by one medium.

From what has been said it will be noted that I have produced an extremely-simple process by which thorough conversion and saccharification may be effected; that by the employment of a vacuum boiling is effected at the temperature at which the best action of the diastase is obtained; that the mashing, boiling, and filtering are accomplished in one operation; that the introduction of the water upwardly in the manner described forces the wort through the filter and out of the tun and also dilutes the wort; that these steps are accomplished by one medium, and that by drawing off the vapors and condensing the steam arising from the mash I am enabled to maintain a vacuum and the necessary amount of liquid. It will further be noted that there are no preliminary treatments of the malt and grain beyond the step of their being pulverized and thoroughly commingled before being introduced into the tun. The starch of the grain becomes receptive to the action of the diastase of the malt when it is gelatinized, and this gelatinizing and utilization of the diastase at a temperature to perform the action stated can only be effected in a vacuum which will enable the mash to be boiled and yet not exceed a temperature of 148° to 152° Fahrenheit, since the temperature at which boiling would be attained without the vacuum would result in a condition of the diastase of no value in its action upon the starch. Furthermore, the vacuum must according to my process be created after the introduction of the materials and must be maintained constantly within certain limits.

Practice has demonstrated that by my invention the amount of malt required for a given quantity of convertible substance is about one-third of that heretofore found necessary.

While I have described my process as applied to brewing, yet it is obvious that it may be employed for any purpose where the end sought is the separation of fluid extract from solid substances.

I claim as my invention—

1. The herein-described mashing and converting process consisting in mixing malt with raw grain, mashing the mixture in a body of water, exhausting the air from the mash to create a vacuum, boiling the ingredients in the vacuum, and condensing the vapors arising during the boiling and returning them to the mash, substantially as set forth.

2. The herein-described mashing and converting process consisting in mixing malt with raw grain, pulverizing the mixture, mashing the mixture in a body of water, creating a vacuum in the mash, boiling the mash in the vacuum, condensing the vapors arising from the boiling and returning them to the mash, and forcing liquid upwardly into the mash to effect the filtration of the wort.

In testimony whereof I affix my signature in presence of two witnesses.

CHARLES HAYES CASPAR.

Witnesses:
WILLIAM J. FITZGERALD,
JAMES F. BELL.